United States Patent

Hayashi et al.

[11] Patent Number: 5,186,687
[45] Date of Patent: Feb. 16, 1993

[54] CONSTANT VELOCITY JOINT HAVING CROSS GROOVES

[75] Inventors: Yasuaki Hayashi, Kariya; Tadashi Tomita; Kenzo Yokoyama, both of Chiryu; Setsuji Suzuki, Okazaki; Yoshihito Uno, Toyota, all of Japan

[73] Assignee: Toyoda Koki Kabushiki Kaisha, Kariya, Japan

[21] Appl. No.: 721,835

[22] Filed: Jun. 26, 1991

[30] Foreign Application Priority Data

Jun. 29, 1990 [JP] Japan ................................. 2-173957

[51] Int. Cl.$^5$ ................................................. F16D 3/22
[52] U.S. Cl. ..................................... 464/144; 464/906
[58] Field of Search ................ 464/144, 143, 141, 145, 464/906

[56] References Cited

U.S. PATENT DOCUMENTS

| | | | |
|---|---|---|---|
| 3,475,924 | 11/1969 | Aucktor | 464/144 |
| 3,488,979 | 1/1970 | Croset | 464/906 X |
| 3,613,397 | 10/1971 | Okoshi | 464/906 X |
| 4,464,143 | 8/1984 | Bowyer | 464/906 X |

FOREIGN PATENT DOCUMENTS

| | | |
|---|---|---|
| 1360767 | 4/1964 | France . |
| 1389903 | 4/1975 | United Kingdom . |
| 2036255 | 6/1980 | United Kingdom . |

Primary Examiner—Daniel P. Stodola
Assistant Examiner—Tony A. Gayoso
Attorney, Agent, or Firm—Oblon, Spivak, McClelland, Maier & Neustadt

[57] ABSTRACT

A constant velocity joint of the cross groove type wherein the outer joint member and the inner joint member are provided with a plurality of guide grooves circumferentially inclining with respect to their rotational axes. Each of the guide grooves is divided into a groove center portion having a symmetric shape with respect to the center line of the groove, and a pair of groove end portions having an asymmetric shape with respect to the center line of the groove. The pair of groove end portions of each guide groove have a depth larger than that of the groove center portion thereof so that a grinding wheel is prevented from contacting with the groove end portions during grinding operations on the guide grooves, thereby achieving the grinding operations accurately.

5 Claims, 3 Drawing Sheets

CONSTANT VELOCITY JOINT HAVING CROSS GROOVES

BACKGROUND OF THE INVENTION

1. Field of the Invention

The present invention relates to a constant velocity joint used for the transmission of rotational torque in a motor vehicle and the like. More particularly, it relates to a constant velocity joint of the cross groove type, wherein the outer and inner joint members have plural guide grooves inclining with respect to their rotational axis in circumferential directions.

2. Discussion of the Prior Art

A constant velocity joint shown in FIG. 8 is know as the cross groove constant velocity joint. The constant velocity joint is composed of an outer joint member 1c, an inner joint member 2c disposed within the outer joint member 1c in a coaxial relationship therewith, plural balls 3c disposed between the outer and inner joint members 1c and 2c, and a cage 4c holding the balls 3. The outer joint member 1c has circumferentially spaced plural first guide grooves 15c extending from one open end of the outer joint member 1c to the other open end thereof. Alternate ones of the first guide grooves incline with respect to the rotational axis of the outer joint member 1c in one circumferential direction, and remaining ones of the first grooves incline with respect to the rotational axis in the opposite circumferential direction. Also, the inner joint member 2c has circumferentially spaced plural second guide grooves 24c extending from one end of the inner joint member 2c to the other end thereof. The second guide grooves 24c are formed at circumferential locations corresponding respectively to the circumferential locations of the first guide grooves 15c, and each of the second grooves 24c inclines with respect to the rotational axis of the inner joint member 2c in a circumferential direction opposite to that of corresponding one of the first guide grooves 15c. The plural balls 3c are disposed between the first guide grooves 15c and the second guide grooves 24c for rolling movement, and are held by windows 45c of the cage 4c.

In a process of producing the outer and inner members 1c and 2c, the first and second guide grooves 15c and 24c are formed using a milling cutter, and their machined guide surfaces are then ground using a grinding wheel having a hemispheric shape.

To grind the first and second guide grooves 15c and 24c accurately, it is required to take into account the pitch diameter of the balls 3c, errors in pitch between every two adjacent guide grooves, errors in pitch between every two alternate guide grooves, the radius of the guide grooves, the contact angle between the balls 3c and the guide grooves, and the like.

However, since the first and second guide grooves 15c and 24c are formed to incline circumferentially, as shown FIGS. 9 and 10, respectively, the both end portions 17c and 26c of the first and second guide grooves 15c and 24c are asymmetric with respect to the center lines L3, L4 of the guide grooves 15c and 24c, respectively. This asymmetry in the shape of the guide groove 15c and 24c causes a problem during the grinding operation. Namely, when the grinding wheel G passes through the end portion 17c of one of the first guide grooves 15c, the contacting area between the grinding wheel G and one side surface Sa of the guide groove 15c is larger than the contacting area between the grinding wheel G and the other side surface Sb of the guide groove 15c, as shown in FIG. 9. This causes the grind wheel to slightly move in a lateral direction perpendicular to the center line L3, the moving locus of the grinding wheel deviating from the center line L3 of the first guide groove 15c. As a result, it becomes difficult to accurately grind the whole area of the first guide grooves 15c, thereby giving a bad influence on rolling movements of the balls 3c after assembly. Above problem also occurs when the second guide grooves 24c are ground.

SUMMARY OF THE INVENTION

Accordingly, it is an object of the present invention to provide an improved constant velocity joint whose guide grooves can be ground accurately even if the guide grooves incline in circumferential directions.

Another object of the present invention is to provide an improved constant velocity joint whose guide grooves have shapes suitable for accurate grinding.

Briefly, a constant velocity joint according to the present invention is composed of an outer joint member having a plurality of first guided grooves in its inner surface, inner joint member having a plurality of second guide grooves in its outer surface, a plurality balls disposed between the first guide grooves and the second guide grooves, and a cage disposed between the outer joint member and the inner joint member for holding the balls. Alternative ones of the first guide grooves incline with respect to the rotational axis of the outer joint member in a circumferential direction while remaining ones of the first guide grooves incline with respect to the rotational axis in the circumferentially opposite direction, and every one of the second guide grooves inclines with respect to the rotational axis of the inner joint member in a circumferential direction opposite to that of corresponding one of the first guide grooves. Further, every groove of the first guide grooves and/or second guide grooves is provided with a pair of groove end portions formed at both ends of the groove, respectively, the depth of the groove end portions is larger than that of the center portion of the groove.

As described above, in the constant velocity joint according to the present invention, each of the first guide grooves and/or second guide grooves is divided into a groove center portion and a pair of groove end portions which is located at the both sides of the groove center portion and whose depth is larger than that of the groove center portion. The groove end portions correspond to areas which are located at both ends of every guide groove, and are asymmetric with respect to the groove center line. Therefore, the grinding wheel always contacts equally with both side surfaces of the guide grooves during the grinding operation on the guide grooves. This allows the grinding wheel to proceed along their groove center lines without being moved in a lateral direction perpendicularly to the center line by a machining reaction force applied to the grinding wheel. Accordingly, the guide grooves can be ground very accurately, thereby allowing the balls to roll smoothly after assembly.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENT

Figure 1:
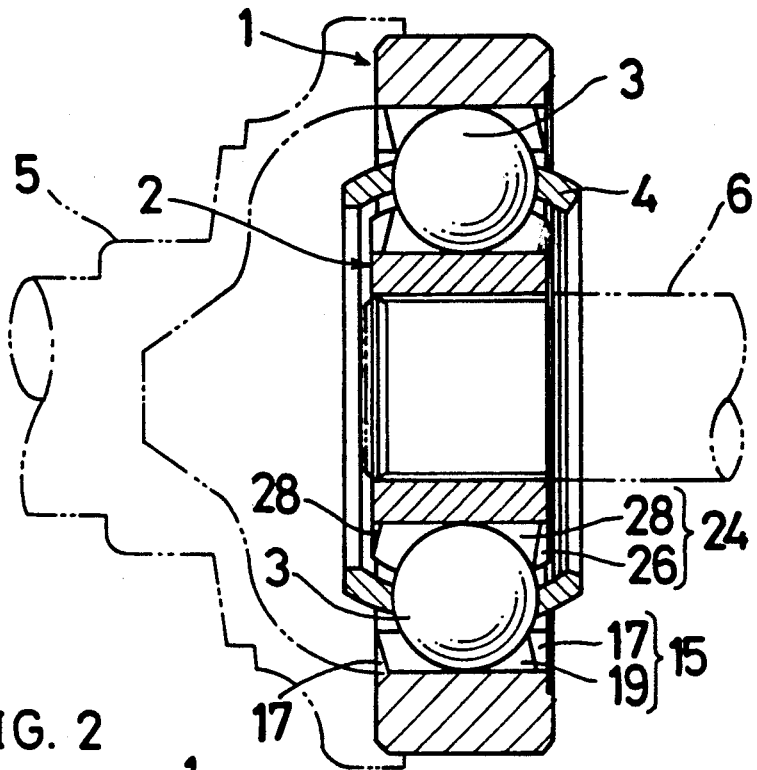
FIG. 1 is a sectional view of a constant velocity joint according to a first embodiment of the present invention.

Referring now to the drawings and particularly, to FIG. 1 thereof, this shows a first embodiment of constant velocity joint according to the present invention. The joint is mainly composed of an outer joint member 1, an inner joint member 2, plural balls 3 and a cage 4. The outer joint member 1 has circumferentially spaced plural first guide grooves 15 each of which is composed of a first groove center portion 19 and a pair of first groove end portions 17, while the inner joint member 2 has circumferentially spaced plural second guide grooves 15 each of which is composed of a second groove center portion 28 and a pair of second groove end portions 26. The balls 3 are disposed between the first and second guide grooves 15 and 24 and held by the cage 4.

Figure 2:
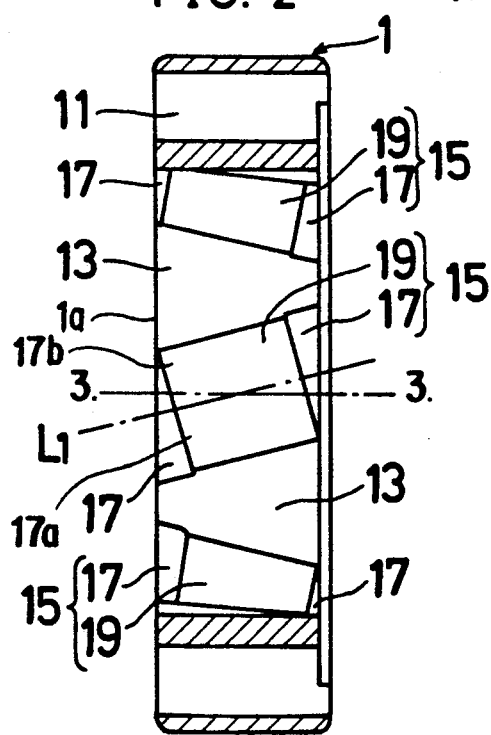
FIG. 2 is a sectional view of the outer joint member shown in FIG. 1.
Figure 3:
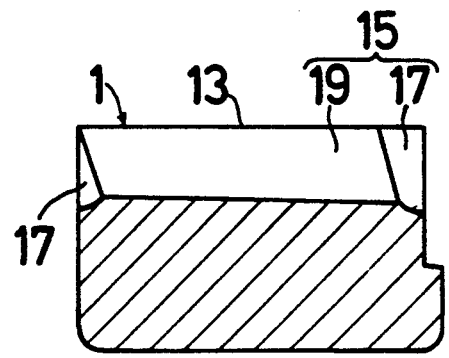
FIG. 3 is a sectional view taken along the line III—III of FIG. 2.

The outer joint member 1 has a short cylindrical shape, as shown in FIG. 2, and one end of a drive shaft 5 is attached thereto using plural mounting bolts (not shown). The outer joint member 1 is formed with plural holes 11 into which the mounting bolts are attached. The inner surface of the outer joint member 1 has a cylindrical shape, and is formed with six first guide grooves 15 each having a semicircular cross section and extending in the axial direction from one open end of the outer joint member 1 to the other open end thereof. Further, alternate ones of the first guide grooves 15 incline with respect to the rotational axis of the outer joint member in one circumferential direction, and remaining ones of the first grooves 15 incline with respect to the rotational axis in the opposite circumferential direction. As shown in FIGS. 2 and 3, each of the first guide grooves 15 is composed of a first groove center portion 19 which has a symmetric shape with respect to the groove center line L1 and has a predetermined depth, and a pair of first groove end portions 17 each of which has an asymmetric shape with respect to the groove center line L1 and has a depth larger than that of the first groove center portion 19. Each of the first groove end portions 17 has an arclike cross section in the direction of the center line L1. As a result, a step is formed between the first groove center portion 19 and the first groove end portions 17, as shown in FIG. 3. Each of the groove end portions 17 intersects with the center portion of a respective one of the grooves at a line of intersection 17a. The line of intersection is inclined with an axial end surface, e.g., 1a, of the respective one of the inner and outer joint members by an angle substantially corresponding to the angle of inclination of the respective one of the grooves. One end 17b of each of the lines of intersection 17a intersects the axial end surface 1a. The first guide grooves 15 are machined using a milling tool, and the machined surfaces thereof are then subjected to heat treatment. After that, the first groove center portion 19 of every first guide groove is ground so that a rolling surface for balls 3 is formed thereon. The step between the first groove end portions 17 and first groove center portion 19 is larger than a machining allowance for the milling and grinding operations on the first groove center portion 19.

Figure 4:
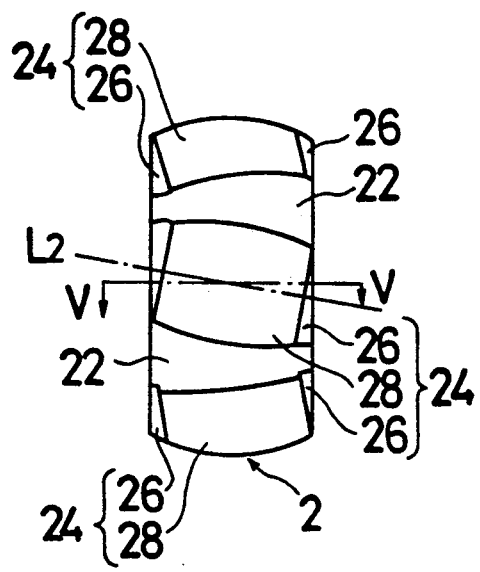
FIG. 4 is an outside view of the inner joint member shown in FIG. 1.
Figure 5:
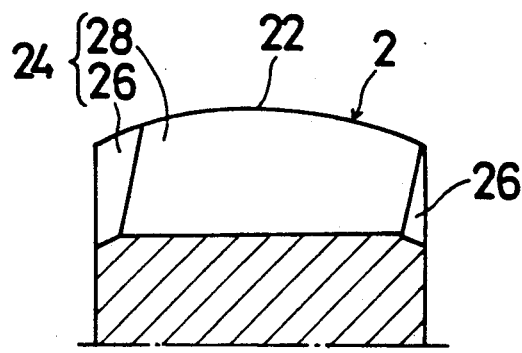
FIG. 5 is a sectional view taken along the line V—V of FIG. 4.

The inner joint member 2 also has a short cylindrical shape having an axial length almost same as that of the outer joint member 1, as shown in FIG. 1. The inner joint member 2 is disposed within the outer joint member 1 in a coaxial relationship therewith, and is formed with a hole into which one end of a driven shaft 6 is inserted. The outer surface 22 of the inner joint member 2 has a spherical shape, and a predetermined clearance is formed between the outer surface 22 of the inner joint member 2 and the inner surface of the outer joint member 1. The second guide grooves 24 are formed on the outer surface 22 at circumferential locations corresponding to those of the first guide grooves 15. Each of the second guide grooves 24 has a semicircular cross section and extending in the axial direction from one end of the inner joint member 2 to the other end thereof. Further, each of the second guide grooves 24 incline with respect to the rotational axis of the inner joint member 2 in a circumferential direction opposite to that of corresponding one of the first guide grooves 15. As shown in FIGS. 4 and 5, each of the second guide grooves 24 is composed of a second groove center portion 28 which has a symmetric shape with respect to the groove center line L2 and has a predetermined depth, and a pair of second groove end portions 26 each of which has a asymmetric shape with respect to the groove center line L2 and has a depth larger than that of the second groove center portion 28. Each of the second groove end portions 26 also has an arclike cross section. As a result, a step is formed between the second groove center portion 28 and the second groove end portions 26. The second guide grooves 24 are also machined using a milling tool, and the surfaces thereof are then subjected to heat treatment. After that, the second groove center portion 28 of every guide groove is ground using a grinding wheel. The step between the second groove end portions 26 and second groove center portion 28 is larger than a machining allowance for the milling and grinding operations on the second groove center portions 28.

Each of the balls 3 made of steel is disposed between one of the first guide groove 15 and corresponding one of the second guide groove 24 for rolling movement therebetween.

The cage 4 has a cylindrical shape and has an outer surface 41 facing the inner surface 13 of the outer joint member 1 and an inner surface 43 facing the outer surface 22 of the inner joint member 2. The cage 4 is formed with six windows 45 equally spaced in the circumferential direction, and the balls 3 are held by the windows 6.

In a constant velocity joint having above structure, the rotational torque of the drive shaft 5 is first transmitted to the outer joint member 1, and then transmitted to the inner joint member 2 via the balls 3, whereby the driven shaft 6 is rotated at the speed same as that of the drive shaft 5.

When the intersecting angle between the drive shaft 5 and driven shaft 6 changes, the balls 3 move along the first and second guide grooves 15 and 24 while being held by the cage 4, thereby allowing the change in the intersecting angle.

As described above, the groove end portions 17 and 26 of the first and second guide grooves 15 and 24 have depths larger than those of the groove center portions 19 and 28, respectively. Therefore, a grinding wheel does not contact with the groove end portions 17 and 26, which have asymmetric shapes with respect to there center lines, during grinding operations on the first and second guide grooves 15 and 24. This means that only the first and second groove center portions 19 and 28 are ground by the grinding wheel. Therefore, there is no time period during which the grinding wheel contacts only with one side surfaces of the first and second guide grooves 15 and 24. This eliminates or decreases imbalance in the machining reaction force to the grinding wheel which is applied from both side surfaces of the guide grooves, thereby allowing the grinding wheel moving accurately along their center line. As a result, the first and second guide grooves 15 and 24 can be ground accurately.

Also, since the first and second groove end portions 17 and 26 are not required to be ground, it is possible to shorten the machining time, extend the interval of dressing operation on the grinding wheel, and extend the service life of the girding wheel.

Furthermore, the weight of the joint becomes lighter as compared with conventional joints, because the first and second groove end portions 17 and 26 are formed and their depths are larger than the first and second groove center portions 19 and 28, respectively.

Figure 6:
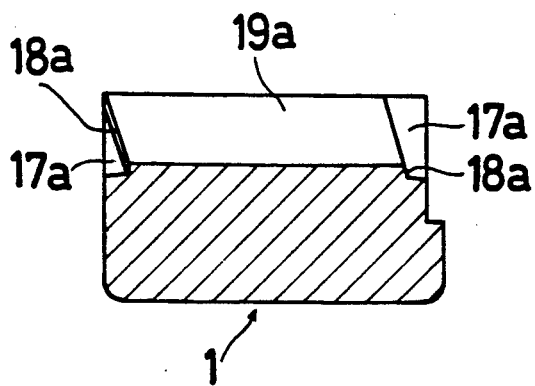
FIGS. 6 and 7 are sectional views of the outer joint members showing second and third embodiments of the present invention, respectively.
Figure 7:
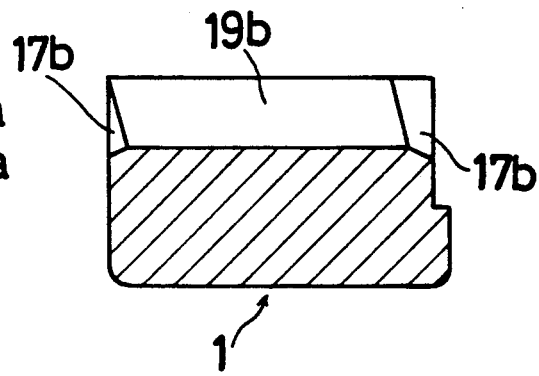
Figure 8:
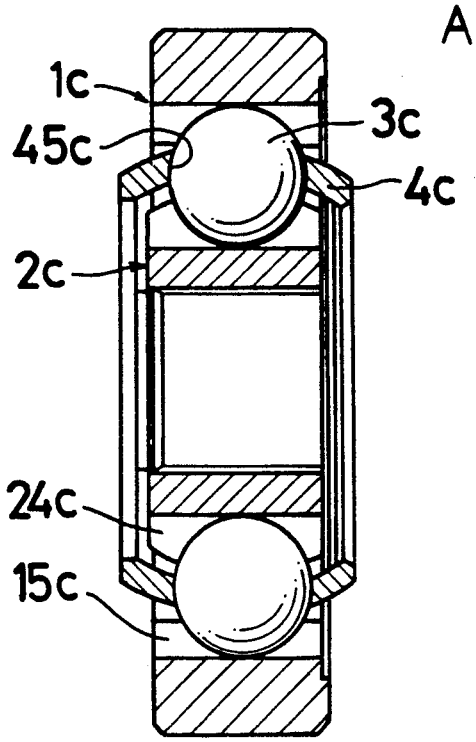
FIG. 8 is a sectional view of a conventional constant velocity joint.
Figure 9:
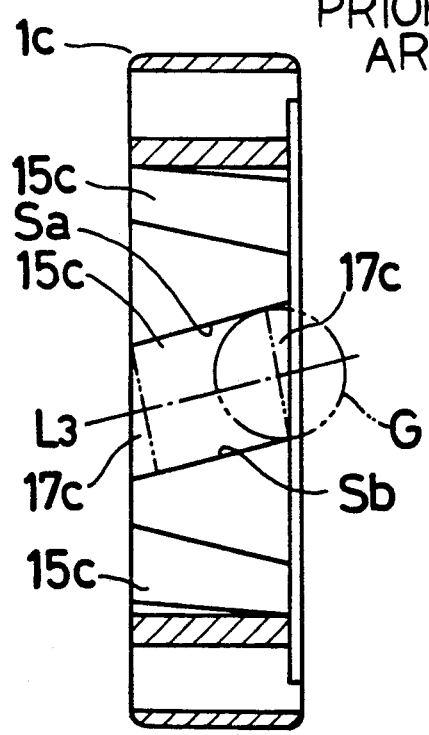
FIG. 9 is a sectional view of the outer joint member shown in FIG. 8.
Figure 10:
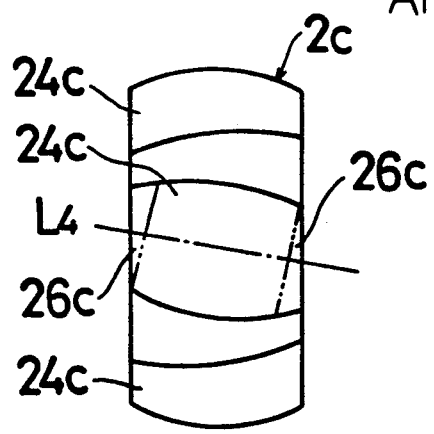
FIG. 10 is an outside view of the inner joint member shown in FIG. 8.

Although, the first and second groove end portions 17 and 26 have arclike cross section, those grooves can be formed in different shapes. FIG. 6 shows a second embodiment which shows a first modification of the first guide grooves 15. In this embodiment, each of the groove end portions 17a has a flat surface parallel to the rotational axis of the outer joint member 1 and a step portion 18a perpendicularly intersecting with the groove end portions 17a is formed between the end portion 17a and the groove center portion 19a. FIG. 7 shows a third embodiment which shows a second modification of the first guide grooves 15. In this embodiment, each of the groove end portions 17b has a tapered surface, and its depth is equal to that of the groove center portion 19b at a location adjacent to the groove center portion 19b and larger at a location adjacent to the end surface of the outer joint member 1. The groove end portions can also be modified to have a curved surface composed of a flat surface and an arclike surface.

Although the fist and second groove center portions 19 and 28 are subjected to grinding operations, in the above embodiments, inner parts of the first and second groove end portions 17 and 26 adjacent to the first and second groove center portions 19 and 28 may be ground.

Further, in the above embodiments, groove end portions are formed at both of the first and second guide grooves 15 and 24, the same advantage of the present invention can be obtained even if the groove end portions are formed at the first guide grooves 15 only or the second guide grooves 24 only.

Obviously, numerous modifications and variations of the present invention are possible in light of the above teachings. It is therefore to be understood that within the scope of the appended claims, the present invention may be practiced otherwise than as specifically described herein.

What is claimed is:

1. A constant velocity joint composed of an outer joint member having a plurality of first guide grooves in its inner surface, an inner joint member having a plurality of second guide grooves in its outer surface, a plurality balls disposed between said first guide grooves and said second guide grooves, and a cage disposed between said outer joint member and said inner joint member for holding said balls, each of said first guide grooves inclining with respect to the rotational axis of said inner joint member in circumferential direction and each of said second guide grooves inclining with respect to the rotational axis of said inner joint member in a circumferential direction opposite to that of corresponding one of said first guide grooves, wherein every groove of said first guide groove and/or said second guide grooves is provided with a pair of groove end portions formed at both ends of said groove and asymmetric shapes with respect to the center line of said groove, the depth of said groove end portions being larger than that of the center portion of said groove, wherein each of said groove end portions intersects with the center portion of a respective one of said grooves at a line of intersection, said line of intersection being inclined with an axial end surface of the respective one of said inner and outer joint members by an angle substantially corresponding to the angle of inclination of the respective one of said grooves, and wherein one end of each of said lines of intersection intersects the axial end surface of the respective one of said inner and outer joint members.

2. A constant velocity joint according to claim 1, wherein alternative ones of said first guide grooves incline in one circumferential direction and remaining ones of said first guide grooves incline in the other circumferential direction, while every one of said second guide grooves inclines in a circumferential direction opposite to that of corresponding one of said first guide grooves, and wherein every groove of said first guide grooves and said second guide grooves is provided with said pair of groove end portions.

3. A constant velocity joint according to claim 2, wherein said groove end portions of every guide groove have curved cross sections in the direction of the center line of said every guide groove.

4. A constant velocity joint according to claim 2, wherein said groove end portions of every guide groove have tapered cross sections in the direction of the center line of said every guide groove.

5. A constant velocity joint according to claim 2, wherein each of said groove end portions of every guide groove is composed of a flat portion parallel to said every guide groove and a shoulder portion perpendicularly intersecting with said flat portion.

* * * * *